(12) United States Patent
Ono et al.

(10) Patent No.: US 7,208,207 B2
(45) Date of Patent: *Apr. 24, 2007

(54) LINER FOR HIGH PRESSURE GAS CONTAINER AND HIGH PRESSURE GAS CONTAINER

(75) Inventors: Satoru Ono, Nishikasugai-gun (JP); Junji Koizumi, Nishikasugai-gun (JP); Yasuhiro Nishimura, Nishikasugai-gun (JP); Shingo Shimojima, Nishikasugai-gun (JP); Keiji Takenaka, Nishikasugai-gun (JP); Tetsuya Suzuki, Nishikasugai-gun (JP); Tsuyoshi Kato, Nishikasugai-gun (JP); Kuniyoshi Kondo, Nishikasugai-gun (JP); Takashi Ishikawa, Okazaki (JP); Hirokazu Shimizu, Okazaki (JP); Itsuo Kamiya, Toyota (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 651 days.

This patent is subject to a terminal disclaimer.

(21) Appl. No.: 10/059,267

(22) Filed: Jan. 31, 2002

(65) Prior Publication Data

US 2002/0150746 A1    Oct. 17, 2002

(30) Foreign Application Priority Data

Jan. 31, 2001   (JP)   ............................. 2001-023453
Dec. 17, 2001   (JP)   ............................. 2001-383434

(51) Int. Cl.
*B29D 22/00*   (2006.01)
*B29D 23/00*   (2006.01)
*B32B 1/08*   (2006.01)

(52) U.S. Cl. ..................... 428/34.1; 428/220; 220/581

(58) Field of Classification Search .............. 428/34.1, 428/220; 220/581
See application file for complete search history.

(56) References Cited

U.S. PATENT DOCUMENTS

| 4,714,094 A | 12/1987 | Tovagliaro |
| 5,025,943 A | 6/1991 | Forsman |
| 5,187,257 A * | 2/1993 | Katto et al. ................. 528/388 |
| 5,227,427 A | 7/1993 | Serizawa et al. |
| 5,499,739 A | 3/1996 | Greist, III et al. |
| 5,670,593 A * | 9/1997 | Araki et al. ................. 526/245 |
| 6,143,815 A * | 11/2000 | Mizutani et al. ............ 524/441 |
| 6,740,707 B2 * | 5/2004 | Ono et al. .................... 525/64 |
| 2004/0220337 A1 * | 11/2004 | Tsutsumi et al. ........... 525/107 |

FOREIGN PATENT DOCUMENTS

| EP | 0353850 A2 * | 2/1990 |
| EP | 0888880 | 1/1999 |
| EP | 0900650 | 3/1999 |
| JP | 1991-351188 | 10/1991 |
| JP | 1993-200141 | 5/1993 |

(Continued)

*Primary Examiner*—Michael C. Miggins
(74) *Attorney, Agent, or Firm*—Posz Law Group, PLC

(57) ABSTRACT

A liner for a high pressure gas container includes a resin composition containing a polyphenylene sulfide resin and an olefin based resin. The resin composition has a methane gas permeability coefficient of $1.7 \times 10^{-16}$ mol·m/m²·s·Pa or smaller at 40° C., and tensile elongation of 50% or greater after fracture at 23° C. A high pressure gas container having such a liner is also provided.

4 Claims, 1 Drawing Sheet

| | FOREIGN PATENT DOCUMENTS | |
|---|---|---|
| JP | 06190980 | 7/1994 |
| JP | 6299071 | 10/1994 |
| JP | 09257193 | 9/1997 |
| JP | 10231997 | 9/1998 |
| JP | 2000198923 | 7/2000 |
| JP | 2001226537 | 8/2001 |
| WO | 0127204 | 10/2001 |

* cited by examiner

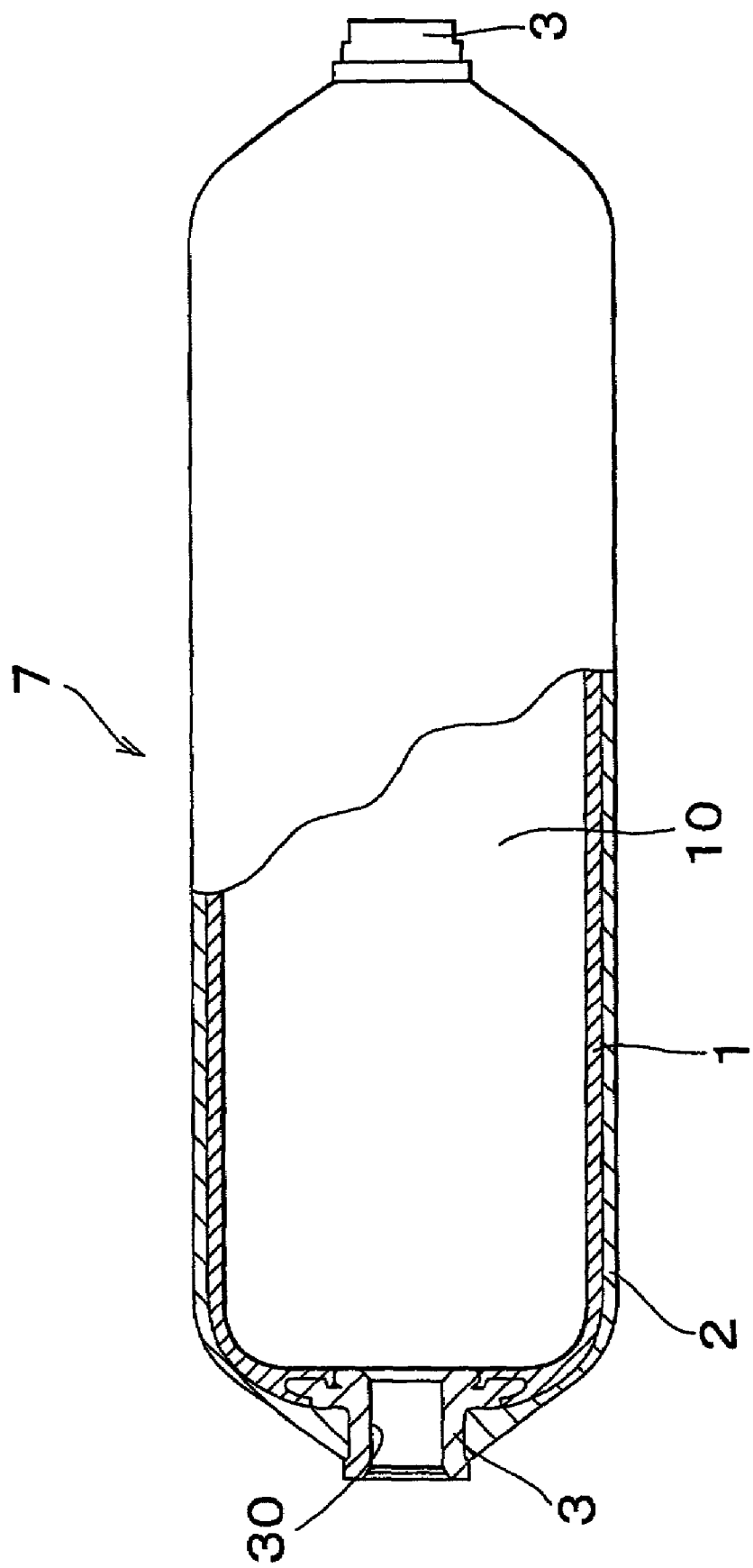

LINER FOR HIGH PRESSURE GAS CONTAINER AND HIGH PRESSURE GAS CONTAINER

INCORPORATION BY REFERENCE

The disclosures of Japanese Patent Applications No. 2001-2353 and No. 2001-383434, each including the specification, drawings and abstract, is incorporated herein by reference in its entirety.

BACKGROUND OF THE INVENTION

1. Field of the Invention

The invention generally relates to a liner used for a high pressure gas container, and also relates to a high pressure gas container having the liner. In particular, the invention is concerned with a liner for a high pressure gas container, which has high degrees of gas impermeability, pressure resistance, and impact resistance.

2. Description of Related Art

Automobiles that use compressed natural gas (hereinafter referred to as "CNG") as a fuel for engines are equipped with high pressure gas containers that are charged with the CNG.

FIG. 1 illustrates an example of high pressure gas container 7, which principally consists of a cylindrical liner 1 for a high pressure gas container, and a shell 2 disposed on the outer surface of the liner 1. A gas chamber 10 is defined by the liner 1 within the shell 2. In addition, bosses 3 are provided at opposite ends of the liner 1, and an opening 30 is formed through a central portion of each of the bosses 3. A high pressure gas, such as CNG, is supplied to or discharged from the gas chamber 10 of the container 7, through the opening 30.

A typical example of the liner for the high pressure container is made of a metal, such as steel, as disclosed in, for example, U.S. Pat. No. 4,714,094. However, the liner made of a metal suffers from a relatively heavy weight. If the high pressure container having such a heavy liner is mounted on a motor vehicle, the vehicle weight becomes heavier, resulting in reduced fuel economy. In view of this problem, light-weight liners made of a resin have been widely used in place of the liners made of a metal. The resin liners may be formed of, for example, polyamide, polyethylene, or the like, as disclosed in U.S. Pat. No. 5,025,943.

It is, however, noted that the liner made of polyethylene has relatively high gas permeability. During use of the container, therefore, hydrocarbon gases may be permeated through the liner, to be discharged or released to the atmosphere, which is undesirable in terms of environmental protection. On the other hand, the liner made of polyamide has excellent gas impermeability as compared with the liner made of polyethylene, but has relatively low impact resistance and chemical resistance. Although the impact resistance may be improved by adding a plasticizer to polyamide, the resulting liner is more likely to allow gas to permeate therethrough. It is thus difficult to provide both excellent gas impermeability and excellent impact resistance at the same time. In addition, the liner for a high pressure container is required to exhibit high pressure resistance, since it is normally exposed to a high pressure during use.

The liner having high degrees of gas impermeability, pressure resistance and impact resistance as described above is also desired to be used in a container that is charged with a gas, such as methane, hydrogen, oxygen, or nitrogen, at a high pressure, as well as the CNG container as indicated above.

SUMMARY OF THE INVENTION

It is one object of the invention to provide a liner for a high pressure gas container, which exhibits improved gas impermeability, pressure resistance, and impact resistance. It is another object of the invention to provide a high pressure gas container having such a liner.

To accomplish the above and/or other object(s), there is provided according to a first aspect of the invention a liner for a high pressure gas container, which liner comprises a resin composition containing a polyphenylene sulfide resin and an olefin based resin. The resin composition has a methane gas permeability coefficient of $1.7 \times 10^{-16}$ mol·m/m$^2$·s·Pa or smaller at 40° C., and tensile elongation of 50% or greater after fracture at 23° C.

The liner for the high pressure gas container as described above is principally composed of the above-described resin composition, and therefore provides excellent gas impermeability, pressure resistance, and impact resistance. Thus, the thickness of the liner can be advantageously reduced, and the weight of the high pressure gas container provided with such a liner can be accordingly reduced.

The resin composition as described above has a methane gas permeability coefficient of $1.7 \times 10^{-16}$ mol·m/m$^2$·s·Pa or smaller ($5.0 \times 10^{-11}$ cc·cm/cm$^2$·s·cmHg or smaller) at 40° C. Thus, the liner made of such a resin composition has excellent gas impermeability.

If the methane gas permeability coefficient exceeds $1.7 \times 10^{-16}$ mol·m/m$^2$·s·Pa, the gas impermeability of the liner for high pressure gas container is reduced, resulting in an increase in the amount of gas released to the atmosphere through the liner.

It is more preferable to use a resin composition having a methane gas permeability coefficient of $3.3 \times 10^{-17}$ mol·m/m$^2$·s·Pa or smaller, even more preferably, $2.3 \times 10^{-17}$ mol·m/m$^2$·s·Pa or smaller, so as to provide a liner having an improved gas impermeability, for use in a high pressure gas container.

The high pressure gas container mentioned herein means a container that is charged with a high pressure gas having a gas pressure of 1 MPa or higher. For example, the high pressure gas container may be any one of a CNG container charged with compressed natural gas, a methane gas container charged with methane gas, a hydrogen gas container, an oxygen gas container, and a nitrogen gas container.

The methane gas permeability coefficient described above is determined by measuring the amount of methane gas permeating or passing through the liner, by a differential pressure method in accordance with JIS K7126A. The level or degree of the gas impermeability of the liner for the high pressure gas container is thus defined by the methane gas impermeability coefficient.

According to the first aspect of the present invention, the resin composition used for forming the liner for the high pressure container has tensile elongation of 50% or more after fracture at 23° C. Thus, the liner made of such a resin composition has improved pressure resistance. If the tensile elongation after fracture is less than 50%, on the other hand, the pressure resistance of the liner for the high pressure gas container is undesirably lowered.

More preferably, the resin composition has a tensile elongation of 70% or more after fracture at 23° C. In this case, the pressure resistance of the liner is further improved.

The polyphenylene sulfide resin (hereinafter referred to as "PPS resin") contained in the resin composition is, for example, a polymer having 70 mol % or more, preferably 90 mol % or more, of repeated units each represented by the following formula:

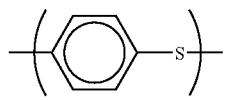

The PPS resin may further contain 30 mol % or less of repeated units each represented by a selected one of the following formulas:

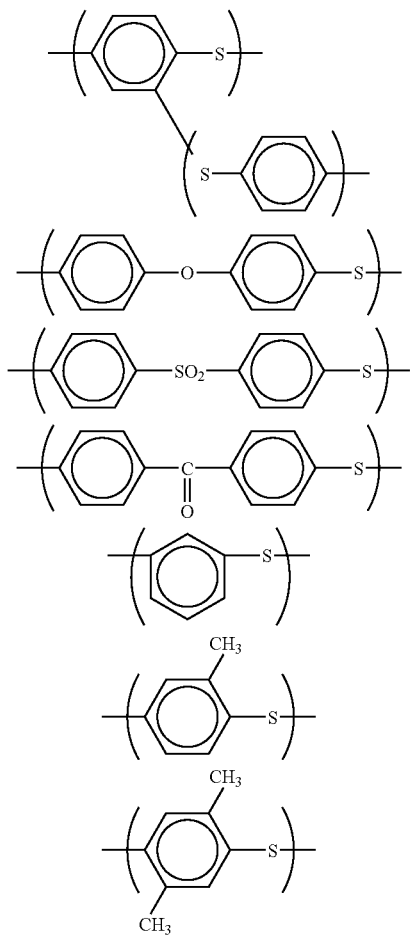

It is preferable that the PPS resin contained in the resin composition is a straight-chain polymer having a relatively high molecular weight. The PPS resin has a melt flow rate (hereinafter referred to as "MFR") of 250 g/10 min. or lower, preferably 150 g/10 min. as measured at 315.5° C. and 49N (5000 g) according to ASTM-D1238. The PPS resin having such a melting viscosity provides a composition having highly balanced flexibility and impact resistance.

The olefin based resin contained in the resin composition is a polymer in which olefin is (co)polymerized. Namely, the olefin based resin may be an olefin polymer, an olefin based polymer, or an olefin based copolymer obtained by incorporating a monomer having a functional group into the olefin based polymer. Examples of the olefin based resin include: (a) (co)polymers obtained by polymerizing α-olefin alone or two or more α-olefins selected from, for example, ethylene, propylene, butene-1, pentene-1, 4-methylpentene-1, and isobutylene; and (b) copolymers of α-olefin, and α,β-unsaturated acid or alkyl ester thereof, such as acrylic acid, methyl acrylate, ethyl acrylate, butyl acrylate, methacrylic acid, methyl methacrylate, ethyl methacrylate, and butyl methacrylate.

The resin composition may further contain optional additives, such as a mold releasing agent, a coloring preventive agent, a lubricant, an ultraviolet light inhibitor, an antioxidant, a coloring agent, and a flame retardant.

The liner for the high pressure container according to the first aspect of the invention may be produced by subjecting the above-described resin composition to injection molding, blow molding, extrusion molding, or the like.

The liner for the high pressure gas container as described above may be mounted in an automobile using CNG as a fuel. Namely, the liner may be used for a tank that stores the CNG fuel to be supplied to the engine.

Preferably, the resin composition used for forming the liner has an Izod impact strength of 500 J/m or greater at 23° C., and, more preferably 600 J/m or greater at 23° C. The Izod impact strength mentioned herein is to be interpreted to mean an Izod impact strength measured in a notched Izod impact test according to ASTM-D256.

When the Izod impact strength is 500 J/m or greater, the liner for the high pressure gas container exhibits further improved impact resistance, in addition to the improved gas impermeability and pressure resistance as described above. If the Izod impact strength is less than 500 J/m, the impact resistance of the liner may be undesirably reduced.

Preferably, the resin composition for forming the liner for the high pressure gas container is obtained by adding about 15 to 50 parts by weight of the olefin based resin to 100 parts by weight of the PPS resin. The liner formed of this resin composition provides further improved tensile elongation after fracture and further improved impact resistance, as well as the improved gas impermeability and pressure resistance as described above. More preferably, the resin composition contains about 15 to 42 parts by weight, further preferably about 18 to 40 parts by weight, even more preferably about 20 to 35 parts by weight, of the olefin based resin, with respect to 100 parts by weight of the PPS resin.

If the content of the olefin based resin with respect to 100 parts by weight of the PPS resin is less than 15 parts by weight, the tensile elongation after fracture and impact resistance of the liner may be undesirably reduced. If the content of the olefin based resin with respect to 100 parts by weight of the PPS resin exceeds 50 parts by weight, the methane gas permeability coefficient may be increased, and the relatively high content of the olefin based resin may affect high degrees of heat resistance, thermal stability and chemical resistance that would be otherwise provided by the PPS resin.

According to a second aspect of the invention, there is provided a high pressure gas container including a shell, and a liner disposed on the inner surface of the shell. The liner for the high pressure gas container is principally formed of a resin composition containing a polyphenylene sulfide resin and an olefin based resin. The resin composition has a methane gas permeability coefficient of $1.7 \times 10^{-16}$ mol·m/m$^2$·s·Pa or smaller at 40° C., and tensile elongation 50% or greater after fracture at 23° C.

The high pressure gas container according to the second aspect of the invention uses the liner for the high pressure gas container according to the first aspect of the invention. Therefore, the high pressure gas container exhibits excellent gas impermeability, pressure resistance, and impact resistance. Thus, the thickness of the liner can be advantageously reduced, and the weight of the high pressure gas container can be accordingly reduced.

Properties and details of the liner for the high pressure container according to the second aspect of the invention are substantially the same as those of the liner according to the first aspect of the invention.

The shell may be formed of, for example, a fiber-reinforced plastic obtained by impregnating fibers, such as carbon fibers, aramid fibers, or glass fibers, with a thermosetting resin. The fiber-reinforced plastic is a favorable material for forming the shell, in view of adhesion with the liner and its light weight. It is particularly preferable to use a plastic reinforced with carbon fibers, for forming the shell.

Preferably, the resin composition used for forming the liner has an Izod impact strength of 500 J/m or greater at 23° C. In this case, the high pressure gas container exhibits further improved impact resistance, in addition to the improved gas impermeability and pressure resistance as described above.

Preferably, the resin composition for forming the liner for the high pressure gas container is obtained by adding about 15 to 50 parts by weight of the olefin based resin to 100 parts by weight of the PPS resin. The liner formed of this resin composition provides further improved tensile elongation after fracture and further improved impact resistance, as well as the improved gas impermeability and pressure resistance as described above.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein:

The single FIGURE is a side view, partly in cross section, showing a high pressure gas container according to one embodiment of the invention.

DETAILED DESCRIPTION OF THE INVENTION

Examples

Some examples of liners for high pressure gas containers, more specifically CNG containers, were prepared by using samples No. 1 to No. 6 as indicated just below, and various properties of these examples were measured in the manners as described later.

Sample No. 1: PPS having a MFR (i.e., melt flow rate) of 100 g/10 min.

Sample No. 2: Alloy of PPS and an olefin based resin, containing 6 parts by weight of olefin A and 19 parts by weight of olefin B, which amount to 25 parts by weight of the olefin based resin, with respect to 100 parts by weight of PPS Sample No. 3: Alloy of PPS and an olefin based resin, containing 15 parts by weight of olefin A and 30 parts by weight of olefin B, which amount to 45 parts by weight of the olefin based resin, with respect to 100 parts by weight of PPS Sample No. 4: Polyketone Sample No. 5: Nylon 11 (referred to as "PA 11" in Tables 1 and 2)

Sample No. 6: High density polyethylene (referred to as "HDPE" in Tables 1 and 2)

The above-indicated olefin A and olefin B contained in Samples No. 2 and No. 3 have respective compositions and properties as follows.

Olefin A: Copolymer of 8 wt % of ethylene and 12 wt % of glycidyl methacrylate

Olefin B: Copolymer of ethylene and 1-butene, which has a density of 861 kg/m$^3$, and MFR(melt flow rate) of 0.5 g/10 min. as measured at 21.18N (2160 g) and at 190° C. in accordance with ASTM D1238

Liners formed of the above samples No. 2 and No. 3 provide Examples No. 2 and No. 3 according to the present invention, and liners formed of the other samples Nos. 1, 4, 5 and 6 provide Comparative Examples Nos. 1, 4, 5 and 6, respectively.

The above-indicated samples No. 1 to No. 6 were subjected to injection molding under conditions that a cylinder was kept at a temperature of 320° C. and a mold was kept at a temperature of 130° C. Then, properties of the resulting products were measured.

Methane Gas Permeability Coefficient

Each specimen (corresponding to each of the above Examples No. 1 to No. 6) in the form of a film having a thickness of 50 to 200 μm was produced by thermal press. For each example, the methane gas permeability coefficient of the film was measured at 40° C., using methane gas, by a differential pressure method in accordance with JIS K7126A. The results are shown in Table 1.

For reference, a hydrogen gas permeability coefficient was measured only with respect to the film made of Sample No. 2 according to the invention. This measurement was conducted in substantially the same manner as the measurement of the methane gas permeability coefficient, except that methane gas was replaced by hydrogen gas. The result is also shown in Table 1.

Tensile Elongation after Fracture

The tensile elongation of each specimen after fracture or breaking thereof was measured at 23° C. and −40° C. in accordance with ASTM-D638. The results are shown in Table 1.

Izod Impact Strength

Each specimen corresponding to each of the above Examples No. 1 to No. 6 was formed with a notch by molding, and the Izod impact strength of the notched specimen was measured at 23° C. and −40° C. in accordance with ASTM-D256. The results are shown in Table 1.

Chemical Resistance

Each of the above Samples No. 1 through No. 6 was molded into No. 1 dumbbell according to ASTM-D638. The dumbbell was immersed in a 19 vol % sulfuric acid solution at 82° C. for 14 days (336 hours). Then, its tensile strength was measured at a room temperature around 23° C., with the specimen being pulled or stretched at a rate of 50 mm/min. The results are shown in Table 1.

Gas Permeability of High Pressure Gas Container

Liners for high pressure gas containers (having a capacity of 7.98 liters) as Examples Nos. 2, 4, 5 and 6 were produced by using Samples Nos. 2, 4, 5 and 6. In producing each of the liners, each of the samples was subjected to injection molding, using a mold in which bosses were already inserted, so as provide a half article of the liner. Then, two half articles were opposed to each other, and were subjected to hot plate welding, to thus provide a cylindrical product as shown in FIG. 1. The liner for the high pressure gas container thus produced had a thickness of about 7 mm.

The liner corresponding to each of Examples Nos. 2, 4, 5 and 6 was then covered with a shell made of a fiber-reinforced plastic. More specifically, the shell was produced by winding carbon fibers impregnated with epoxy resin around the outer circumferential surface of the cylindrical liner, so that the thickness of the shell becomes equal to about 10 mm, and then curing the resin in a curing oven at 100° C. for 2 hours. In this manner, a high pressure gas container having each of Examples Nos. 2, 4, 5 and 6 was produced.

In order to evaluate the gas permeability of the high pressure gas container thus produced, a chamber of the gas container was charged with methane gas at a pressure of 10 MPa. The high pressure container was then placed in an airtight collector chamber, and was allowed to stand in the atmosphere having a temperature of 25 to 29° C. Then, the methane gas collected in the collector chamber was sampled, and was analyzed through gas chromatography so as to determine a gas density. On the basis of the gas density thus determined, the methane gas permeability (cc/liter·hr) per unit volume of the liner and unit time (hour) was calculated.

a suitable amount of an olefin based copolymer exhibit improved toughness, more specifically, shows comparatively large tensile elongation after fracture and comparatively high Izod impact strength.

In addition, Example No. 2 and No. 3 provide an excellent balance of the gas impermeability and the toughness as compared with those of Examples Nos. 4 to 6, and are thus favorably used as liners for high pressure gas containers. In fact, Example No. 2 when used as a liner for a CNG container exhibited lower gas permeability than liners made of other materials. It will be understood from the above description that the resin compositions of Examples No. 2 and No. 3 according to the invention provide excellent gas impermeability, pressure resistance and impact resistance, and thus are suitably used for forming liners for high pressure gas containers.

Referring now to FIG. 1, a liner for a high pressure gas container according to one embodiment of the invention, and a high pressure gas container using such a liner will be hereinafter described in detail.

As shown in FIG. 1, the high pressure gas container 7 of this embodiment includes a cylindrical shell 2 as an outer housing, and a liner 1 disposed on the inner surface of the shell 2. A gas chamber 10 is defined by the liner 1 within the shell 2. In addition, bosses 3 are provided at opposite ends of the liner 1, and an opening 30 is formed through a central

TABLE 1

| Examples | Sample | Composition | | Methane gas permeability coefficient mol·m/m²·s·Pa | Hydrogen gas permeability coefficient mol·m/m²·s·Pa | Tensile elongation after fracture 23° C. | Tensile elongation after fracture −40° C. | Izod Impact strength 23° C. | Izod Impact strength −40° C. | Chemical resistance Tensile strength retention (%) |
|---|---|---|---|---|---|---|---|---|---|---|
| Comparative Example | No. 1 | PPS | | $7.0 \times 10^{-18}$ | — | 27 | 5 | 20 | 15 | — |
| Examples of Invention | No. 2 | Modified PPS | OL 25 parts | $1.8 \times 10^{-17}$ | $9.1 \times 10^{-16}$ | 100 | 40 | 750 | 580 | 105 |
|  | No. 3 |  | OL 45 parts | $4.0 \times 10^{-17}$ | — | 65 | — | 690 | — | — |
| Comparative Examples | No. 4 | Polyketone | | $2.3 \times 10^{-17}$ | — | 330 | 35 | 240 | 50 | 110 |
|  | No. 5 | PA11 | | $9.7 \times 10^{-17}$ | — | 300 | 37 | 90 | 50 | 0 |
|  | No. 6 | HDPE | | $6.6 \times 10^{-16}$ | — | >500 | 250 | not broken | — | 100 |

Modified PPS: Alloy of PPS and olefin based resin (OL) (parts by weight with respect to 100 parts by weight of PPS)

TABLE 2

Gas Permeability of High Pressure Gas Container

| Examples | Sample No. | Composition | | Methane gas permeability cc/liter·hr |
|---|---|---|---|---|
| Comparative Example | No. 1 | PPS | | — |
| Examples of Invention | No. 2 | Modified PPS | OL 25 parts | $2.7 \times 10^{-5}$ |
|  | No. 3 |  | OL 45 parts | — |
| Comparative Examples | No. 4 | Polyketone | | $4.3 \times 10^{-4}$ |
|  | No. 5 | PA11 | | $3.5 \times 10^{-4}$ |
|  | No. 6 | HDPE | | $3.5 \times 10^{-2}$ |

Modified PPS: Alloy of PPS and olefin based resin (OL) (parts by weight with respect to 100 parts by weight of PPS)

It will be apparent from Tables 1 and 2 that Example No. 1 made of PPS and Examples No. 2 and No. 3 containing PPS as a major component provide considerably low methane gas permeability coefficients. It will be also apparent from these tables that Examples No. 2 and No. 3 containing portion of each of the bosses 3. A high pressure gas, such as CNG, is supplied to or discharged from the gas chamber 10 of the container 7, through the opening 30.

The liner 1 for the high pressure gas container is formed in cylindrical shape in the following manner: a semi-cylindrical product is obtained by injection-molding the composition of Sample 2 as indicated in Tables 1 and 2, and two half articles each having a semi-cylindrical shape are butted and thermally welded together, to provide a cylindrical product.

Then, the shell 2 is formed by winding fibers impregnated with a thermosetting resin around the outer surface of the liner 1 as the cylindrical product, and thermally curing the thermosetting resin. In this manner, the high pressure gas container is produced.

The liner 1 for the high pressure gas container may consist of two or three or any suitable number of layers. In the case where the liner 1 consists of two layers, for example, one of the layers that contacts with the shell 2 may be made of the resin composition according to the invention, and the other layer may be made of a resin composition other than those of the invention.

Examples of the thermosetting resin used for forming the shell include epoxy resin, phenol resin, unsaturated polyester resin, and vinyl ester resin. Examples of a fiber sheet to be impregnated with the thermosetting resin include carbon fibers, aramid fibers, and glass fibers.

What is claimed is:

1. A single layer liner for a high pressure gas container, consisting of:
   a resin composition containing a polyphenylene sulfide resin and an olefin based resin,
   wherein said olefin based resin includes a first olefin based copolymer including a functional group, and a second olefin based polymer or copolymer free of a functional group, and the total content of the first olefin based copolymer and the second olefin based polymer or copolymer is 20 to 35 parts by weight with respect to 100 parts by weight of the polyphenylene sulfide resin,
   the resin composition has a methane gas permeability coefficient of $2.3 \times 10^{-10}$ mol·m/m²·s·Pa or smaller at 40° C., and tensile elongation of 50% or greater after fracture at 23° C., and
   the resin composition has a notched Izod impact strength of 600 J/m or greater at 23° C.

2. The single layer liner according to claim 1, wherein the tensile elongation of the resin composition is equal to or greater than 70% after fracture at 23° C.

3. The single layer liner according to claim 1, wherein the polyphenylene sulfide resin has a melt flow rate of 250 g/10 min. or lower as measured at 315.5° C. and 49N (5000 g) according to ASTM-D 1238.

4. A single layer liner for a compressed natural gas container, consisting of:
   a resin composition containing a polyphenylene sulfide resin and an olefin based resin,
   wherein said olefin based resin includes a first olefin based copolymer including a functional group, and a second olefin based polymer or copolymer free of a functional group, and the total content of the first olefin based copolymer and the second olefin based polymer or copolymer is 20 to 35 parts by weight with respect to 100 parts by weight of the polyphenylene sulfide resin,
   the resin composition has a methane gas permeability coefficient of $2.3 \times 10^{-j}$ mol·m/m²·s·Pa or smaller at 40° C., and tensile elongation of 50% or greater after fracture at 23° C., and
   the resin composition has a notched Izod impact strength of 600 J/m or greater at 23° C.

* * * * *

UNITED STATES PATENT AND TRADEMARK OFFICE
CERTIFICATE OF CORRECTION

PATENT NO. : 7,208,207 B2
APPLICATION NO. : 10/059267
DATED : April 24, 2007
INVENTOR(S) : Satoru Ono et al.

Page 1 of 1

It is certified that error appears in the above-identified patent and that said Letters Patent is hereby corrected as shown below:

Tile page

Correct Item (73), as Assignees: Toyoda Gosei Co., Ltd., Nishikasugai-gun (JP)
Should Read
Toyota Jidosha Kabushiki Kaisha, Toyota-shi (JP)

Signed and Sealed this

Twenty-sixth Day of August, 2008

JON W. DUDAS
*Director of the United States Patent and Trademark Office*